United States Patent [19]

Ware et al.

[11] Patent Number: 5,798,997
[45] Date of Patent: Aug. 25, 1998

[54] IMPORT/EXPORT ELEMENT FOR DATA STORAGE LIBRARY

[75] Inventors: Eric A. Ware, Plymouth; Robert G. Hart, Minnetonka, both of Minn.

[73] Assignee: International Data Engineering, Inc., Eden Prairie, Minn.

[21] Appl. No.: 744,107

[22] Filed: Nov. 5, 1996

[51] Int. Cl.⁶ .................. G11B 17/04; G11B 33/02
[52] U.S. Cl. ................. 369/75.2; 369/77.1; 369/36; 360/98.06; 360/99.07
[58] Field of Search ............... 369/34–36, 75.1, 369/75.2, 77.1, 77.2, 178, 191, 258; 360/92, 98.04, 98.06, 99.07

[56] References Cited

U.S. PATENT DOCUMENTS

| | | | |
|---|---|---|---|
| 4,839,758 | 6/1989 | Honjoh | 360/99.06 |
| 5,040,159 | 8/1991 | Oliver et al. | 369/34 |
| 5,140,579 | 8/1992 | Suzuki et al. | 369/77.1 |
| 5,150,341 | 9/1992 | Shibayama | 369/36 |
| 5,181,197 | 1/1993 | Sugie et al. | 369/75.1 |
| 5,245,602 | 9/1993 | Ikedo et al. | 369/75.2 |
| 5,301,176 | 4/1994 | Kawachi et al. | 369/75.2 |
| 5,377,121 | 12/1994 | Dimitri et al. | 364/478 |
| 5,502,697 | 3/1996 | Taki | 369/34 |
| 5,504,733 | 4/1996 | Nakamichi | 369/191 |
| 5,517,473 | 5/1996 | Permut | 369/36 |
| 5,610,882 | 3/1997 | Dang | 369/36 |
| 5,617,395 | 4/1997 | Choi | 369/77.1 |

FOREIGN PATENT DOCUMENTS 61-230665  10/1986  Japan .................. 369/36

*Primary Examiner*—Jefferson Evans
*Attorney, Agent, or Firm*—Palmatier, Sjoquist, Helget & Voigt, P.A.

[57] ABSTRACT

An improved import/export element for a data media storage library for inserting data media into the data media storage library and removing data media from the data media storage library consists of an import/export element base, an import/export element intermediate slider slidingly engaged with the import/export element base, an import/export media drawer holding the media and slidingly engaged with the intermediate slider and extending outside the data media storage library, a motor attached to the import/export element base for moving the intermediate slider into and out of the import/export element base, and a pulley and belt for transmitting the motion of the intermediate slider to the media drawer such that during motion of the intermediate slider the media drawer moves about twice as far as the intermediate slider.

24 Claims, 6 Drawing Sheets

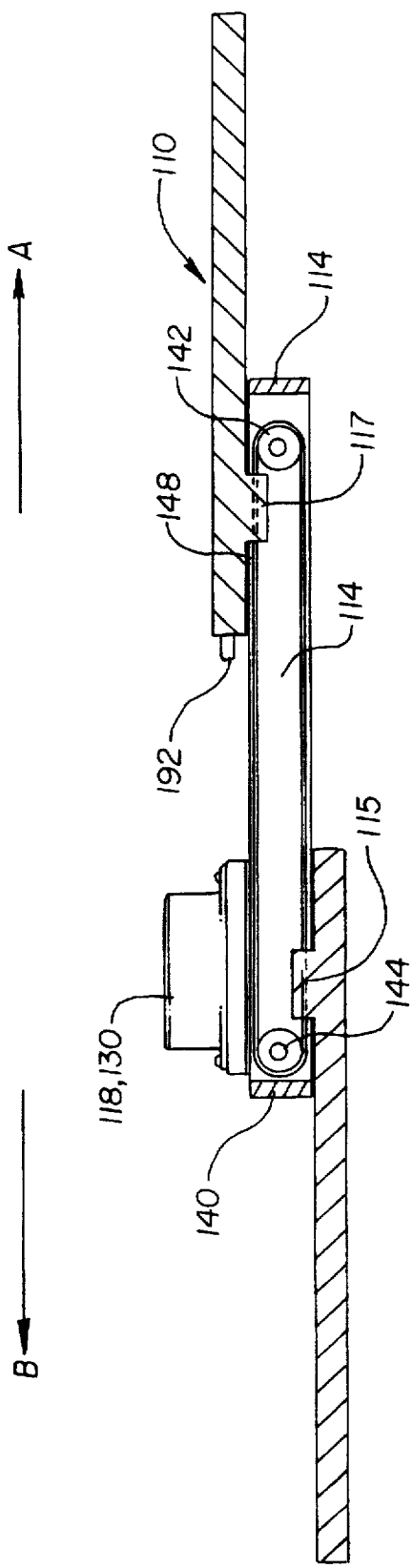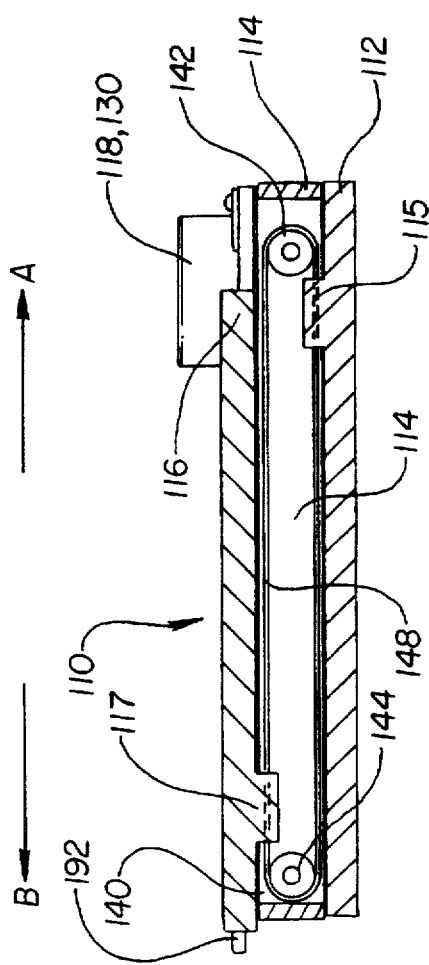

IMPORT/EXPORT ELEMENT FOR DATA STORAGE LIBRARY

BACKGROUND OF THE INVENTION

Storage media library systems (jukeboxes) are devices which contain multiple storage media drives and many pieces of storage media to accommodate installations requiring access to large numbers of storage media, such as optical discs, compact discs and tape cartridges. The storage media may be housed in magazines which contain a fixed number of storage media. Existing storage media library systems are configured to contain a fixed number of magazines and a fixed number of drives.

A typical data media storage library system will have a media transport element servicing an import/export element, a media storage element, and a data transfer element such as a disc drive. Typically, the data transfer element is longer than the media storage element and the import/export element, yet the import/export element, media storage element, and data transfer element must all be aligned vertically within the storage library system in order to be serviced by the media transport element.

Typically, a customer will initially load the data media storage library system with the media that the system or network requires at that time. Later, there may be a need to load individual media into the library system or to remove individual media from the system without interrupting the process or shutting down the machine. For this reason, an import/export element must be available to fulfill this function.

Previously, the media was contained in individual cartridges. With the magazine system the media is transported from the magazine to the data transfer element and returned on an individual tray. This tray may also be used to transport individual media from the import/export element to the magazines or data transfer elements.

Loading individual media into a single media reader system requires only moving the media from the extended position to the read position in the data transfer element. With the individual tray and magazine system loading media requires that an individual tray be presented to the operator outside the machine covers and that tray and media be presented to the media transport element in alignment with the data transfer elements. Since the data transfer elements are typically longer than the media magazines, the import/export element must travel approximately twice the diameter of the media to perform its function. The import/export element must also retain the media tray in such a manner that it cannot be removed by the operator when the mechanism is extended and allow it to be removed by the media transport element when in the retracted position.

There is a need for an improved import/export element which may travel approximately twice the diameter of the media from the retracted position to the extended position in order to extend outside the storage library system in the extended position and still be able to be serviced by the media transport element in the retracted position.

SUMMARY OF THE INVENTION

An improved import/export element for a data media storage library for inserting data media into the data media storage library and removing data media from the data media storage library consists of an import/export element base, an import/export element intermediate slider slidingly engaged with the import/export element base, an import/export media drawer holding the media and slidingly engaged with the intermediate slider and extending outside the data media storage library, drive means attached to the import/export element base for moving the intermediate slider into and out of the import/export element base, and coupling means for transmitting the motion of the intermediate slider to the media drawer such that during motion of the intermediate slider the media drawer moves about twice as far as the intermediate slider.

A principal object and advantage of the present invention is that the import/export element can be aligned for servicing by the media transport element with a longer (approximately twice as long) data transfer element, yet the import/export element can extend to present its media drawer outside the data storage library for loading and removing media.

Another object and advantage of the present invention is that the import/export element automatically latches the media tray as the import/export element extends outside the data storage library system, so that the tray cannot be removed by the operator, yet allows the tray to be removed by media transport element when the import/export element is in the retracted position.

BRIEF DESCRIPTION OF THE DRAWINGS

FIG. 6-1 is a cross-section along the lines 6 of FIG. 5, with the media drawer in the extended position.

FIG. 6-2 is a cross-section along the lines 6 of FIG. 5, with the media drawer in the retracted position.

DETAILED DESCRIPTION OF THE PREFERRED EMBODIMENTS

Figure 1:
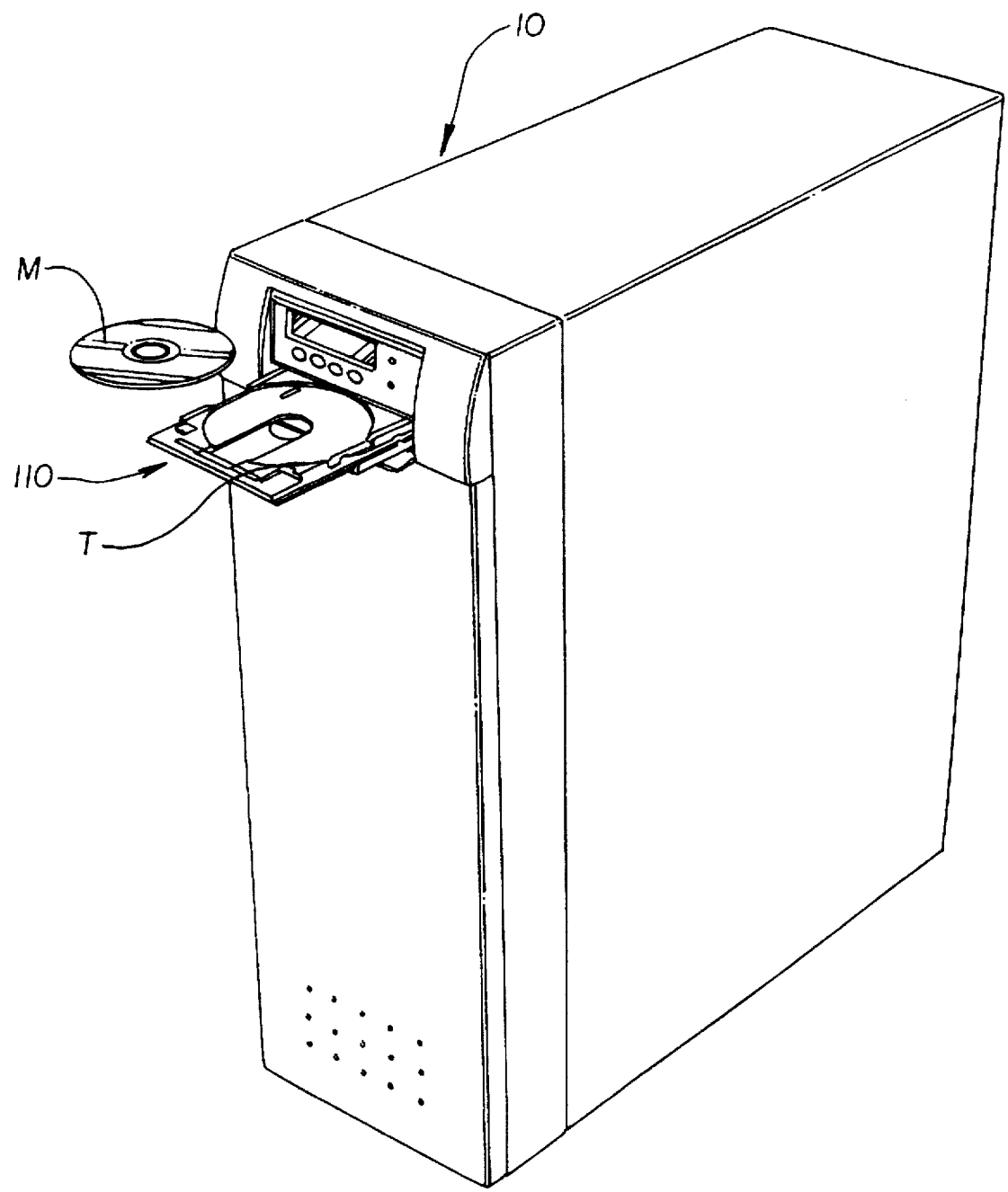
FIG. 1 is a perspective view of a data storage library containing the present invention.
Figure 2:
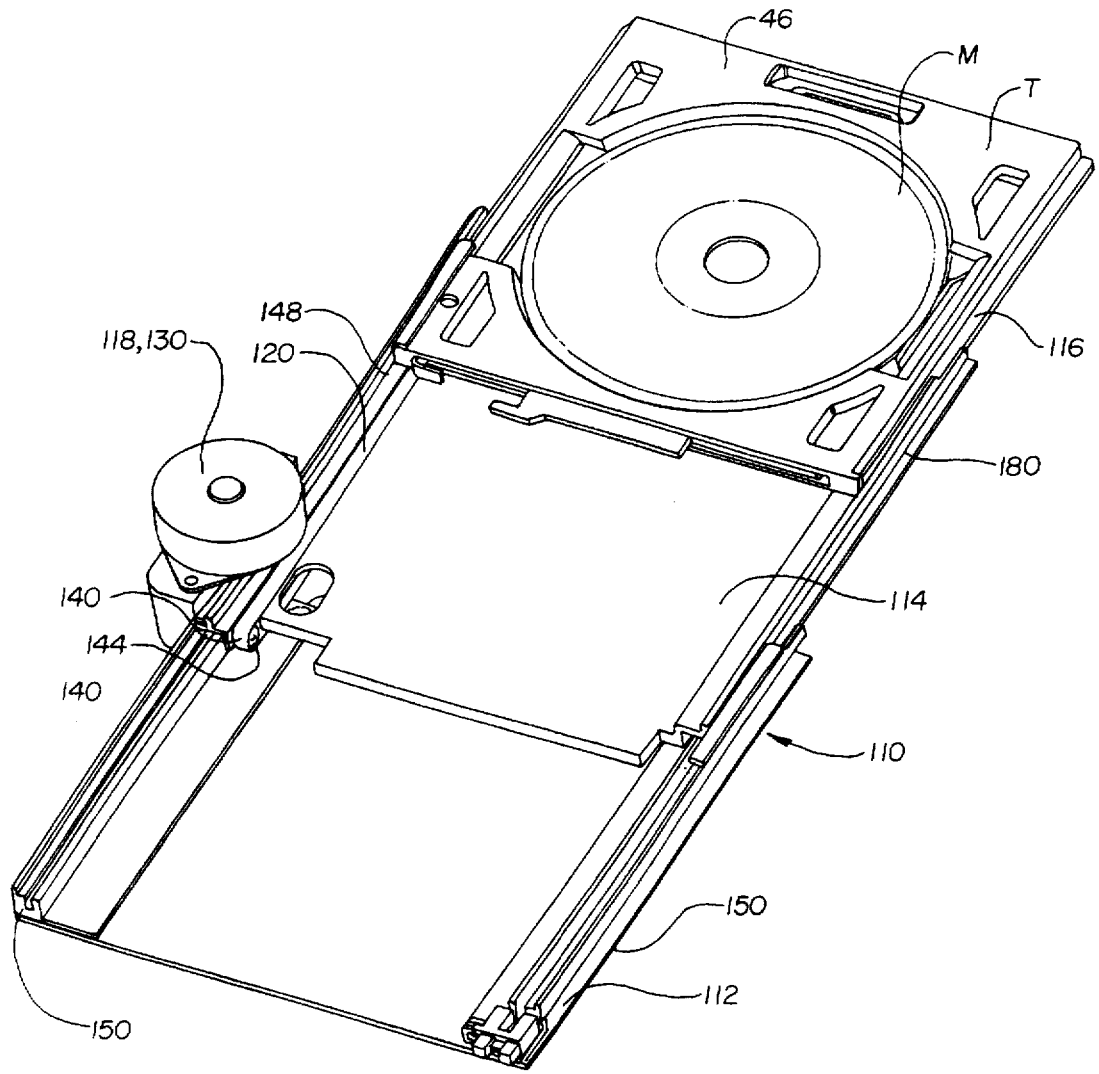
FIG. 2 is a perspective view of the import/export element of the present invention with the media drawer fully extended.
Figure 3:
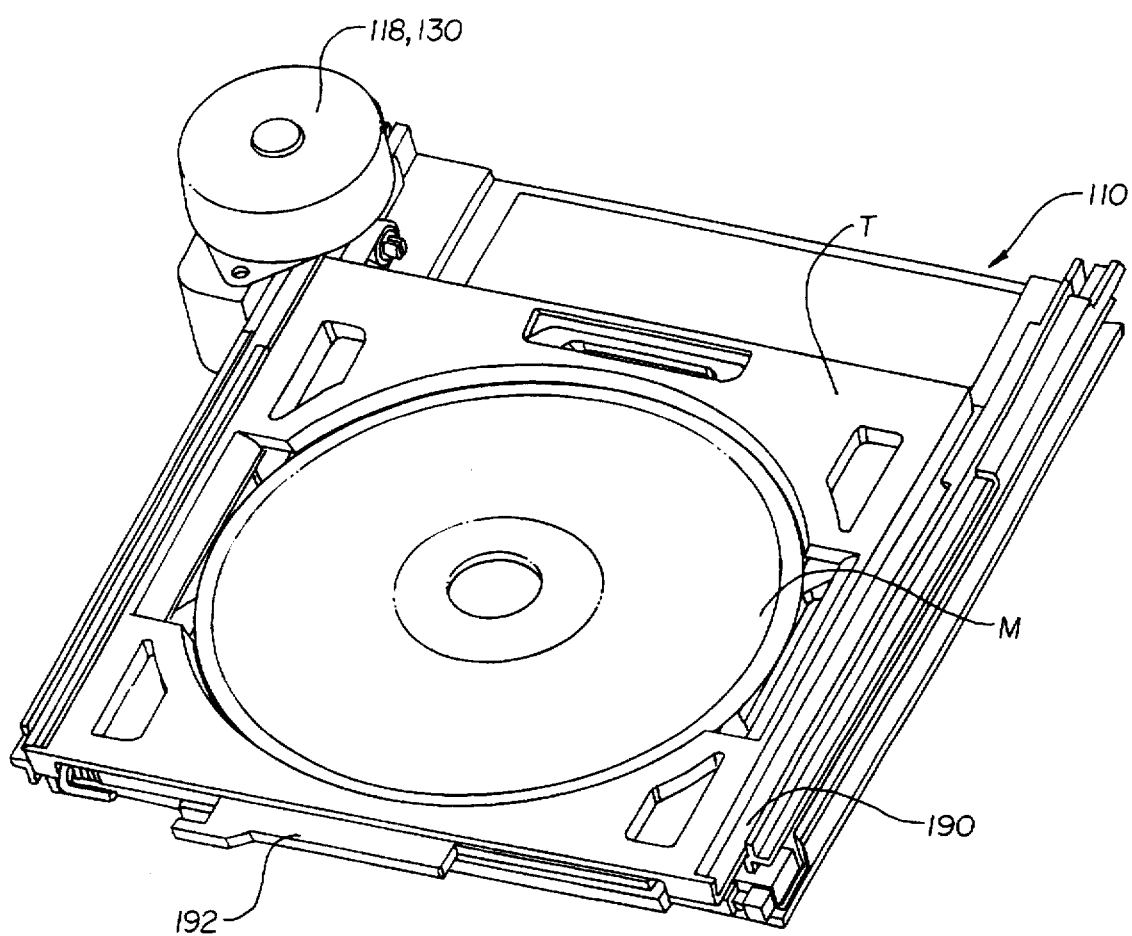
FIG. 3 is a perspective view of the import/export element of the present invention with the media drawer fully retracted.

The data storage library of type used with the present invention is generally shown in the Figures as reference numeral 10.

Arranged within the data storage library is at least one and preferably several media storage elements 40. The media storage elements 40 hold the storage media when the storage media are not being read or written to. The storage media can be any media which can be used to record information, such as data and graphics. The recording means may be magnetic, optical, or any other equivalent recording means known in the storage media art. Preferably, the storage media are compact discs (CDs). Preferably, the media storage elements 40 are trays which hold the CDs.

Also arranged within the data storage library 10 is at least one and preferably several data transfer elements 50, which are used to read and write information on the storage media. Preferably, the data transfer elements 50 are compact disc drives (CD drives) but the data transfer elements 50 may be any equivalent device such as an optical disc drive, a cassette drive, a floppy disc drive or a hard drive. The latest CD drives allow the CD to be written to as well as read from.

in which case the media is called a PD. Such writable PDs are readily available, an example being the Panasonic LM-RP6500A PD.

A media transport element 70 is movable within the data storage library 10 to move the storage media among media storage elements 40 and data transfer elements 50.

In the preferred embodiment, the media storage elements 40 are magazines 44 having a plurality of trays 46 therein for holding compact discs (CDs).

The present invention is an improved import/export element 110 for use in the above data storage library.

The import/export element 110 consists of an import/export element base 112, an import/export element intermediate slider 114, and an import/export media drawer 116. The intermediate slider 114 is slidingly engaged with the base 112 and moves in and out of the base 112. The media drawer 116 holds the media M and is slidingly engaged with the intermediate slider 114 and moves in and out of the base 112 and extends outside the library 10.

The import/export element 110 also has a drive means 118 attached to the base 112 for moving the intermediate slider 114 into and out of the base 112.

The import/export element base also has a coupling. means 120 for transmitting the motion of the intermediate slider 114 to the media drawer 116 such that during motion of the intermediate slider 114 the media drawer 116 moves about twice as far as the intermediate slider 114, whereby the combined length of the intermediate slider 114 and the media drawer 116 is sufficient to move the media drawer 116 from the base 112 to outside the library 10.

Figure 4:
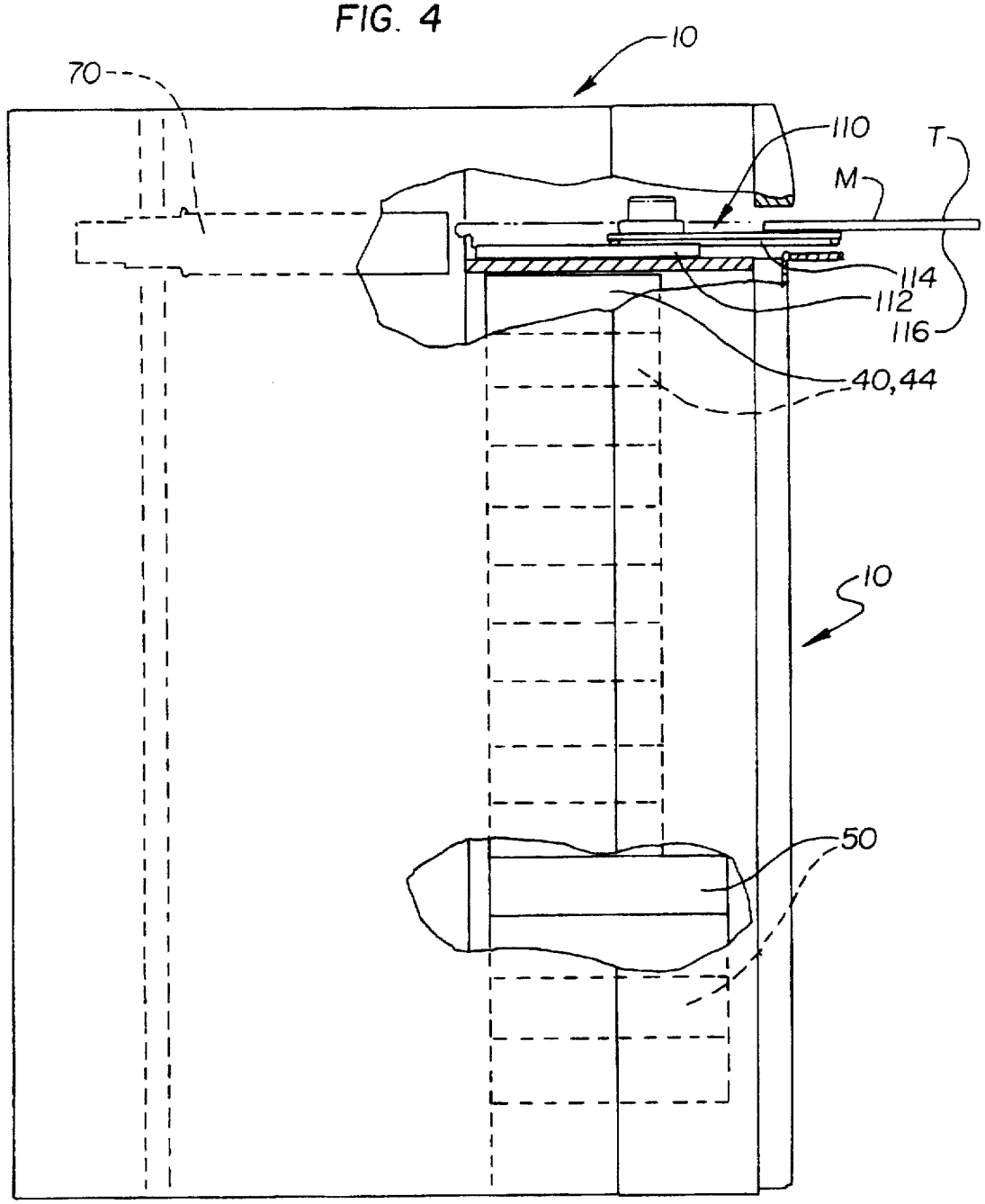
FIG. 4 is a side elevational view of a data storage library containing the present invention.
Figure 5:
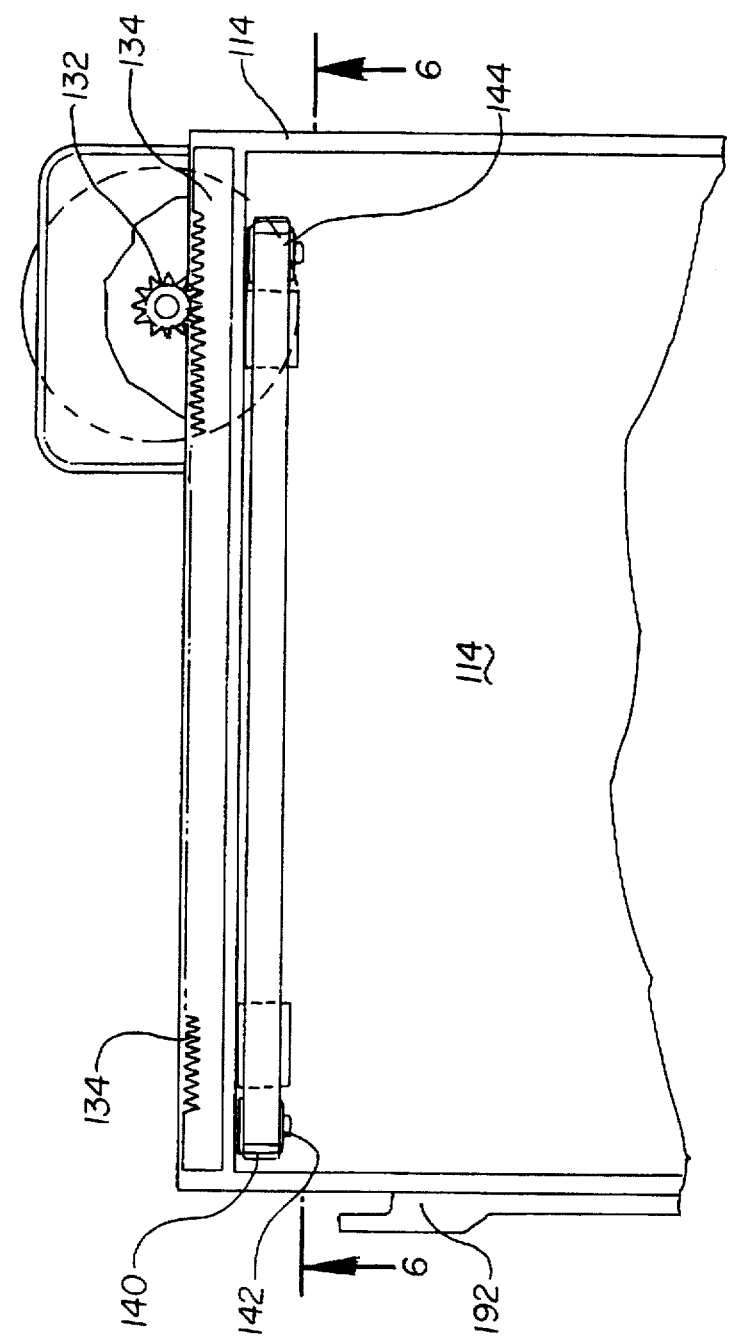
FIG. 5 is a bottom plan view of the import/export element of the present invention.

In the environment of the invention, the media transport element 70 services the import/export element 110, the media storage element 40, and the data transfer element 50. The import/export element 110, the media storage element 40, and the data transfer element 50 are all in substantial alignment (FIG. 4) for servicing by the media transport element 70. Because the data transfer element 50 is substantially longer (perhaps twice as long) as the import/export element 110, the import/export element 110 must move the media M about twice the diameter of the media M to present the media M for insertion or removal by the operator, as shown in FIG. 4. The improved import/export element 110 accomplishes this function. Additionally, the improved import/export element 110 has features which make it of significant value in other data storage library arrangements.

In the preferred embodiment, the drive means 118 comprises a drive motor 130 attached to the base 112, a drive gear 132 driven by the motor 130, and a gear rack 134 attached to the intermediate slider 114 and the gear rack 134 engages the drive gear 132. The drive motor 130 is preferably a stepper motor so that motion of the intermediate slider may be precisely measured.

In the preferred embodiment, the coupling means 120 comprises a drive belt 140, a first idler pulley 142 attached to one end of the intermediate slider 114, and second idler pulley 144 attached to the other end of the intermediate slider 114. The drive belt 140 engages the first idler pulley 142 and second idler pulley 144 and the drive belt 140 has a loop on either side of the intermediate slider 114, one loop 146 being fastened to the import/export element base 112 at a first attachment point 115 and the second loop 148 being fastened to the media drawer 116 at a second attachment point 117.

As the intermediate slider 114 is driven by the motor 130 toward the outside of the data library 10 in the direction of the arrow A in FIG. 6, the loop 148 is forced to rotate over the idler pulley 142 and pulls the media drawer 116 toward the outside of the data library 10. Of course, the media drawer will be pulled forward by the same amount that the intermediate slider moves. As the intermediate slider 114 is driven by the motor 130 into the base 112 in the direction of the arrow B in FIG. 6, the loop 148 is forced to rotate over the idler pulley 144 and pulls the media drawer 116 toward the base 112. The media drawer 116 will be pulled backward by the same amount that the intermediate slider 114 moves.

Because the intermediate slider moves forward or backward at the same time as the belt effect described above, the result is that the media drawer 116 moves about twice as far as the intermediate slider 114.

In the preferred embodiment, the base 112 further comprises a pair of first guide rails 150 slidingly engaging and supporting the intermediate slider 114.

Preferably, the base 112 also has sensors (not shown) for determining the position of the intermediate slider 114 and the media drawer 116.

Preferably, the import/export element base 112 further comprises a stop (not shown) to limit the motion of the intermediate slider 114.

In the preferred embodiment, the intermediate slider 114 has a pair of second guide rails 180 slidingly engaging and supporting the media drawer 116. Preferably, the intermediate slider 114 has a stop (not shown) to limit the motion of the media drawer 116.

In the preferred embodiment, the media M is presented to the import/export element in a media tray T. In this embodiment, the media drawer 116 further comprises a media tray receiving guide 190 and a media tray latch 192 engaging the media tray T as the media drawer extends outside the library 10. This prevents the operator from removing the tray T.

In the most preferred embodiment, the media M is a compact disc in a tray T and the media drawer 116 is compact disc tray drawer 116.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. In a data media storage library for storing and accessing storage media of the type having a media transport element servicing an import/export element, a media storage element and a data transfer element, the data transfer element being longer than the media storage element and the import/export element and the import/export element, media storage element and data transfer element being in substantial alignment for servicing by the media transport element, an improved import/export element for inserting data media into the data media storage library and removing data media from the data media storage library, the improved import/export element comprising:

(a) an import/export element base in substantial alignment with the media storage element and data transfer element for servicing by the media transport element;

(b) an import/export element intermediate slider slidingly engaged with the import/export element base and moving in and out of the import/export element base;

(c) an import/export media drawer holding the media and slidingly engaged with the intermediate slider and moving in and out of the import/export element base and extending outside the data media storage library;

(d) drive means attached to the import/export element base for moving the intermediate slider into and out of the import/export element base; and (e) coupling means for transmitting the motion of the intermediate slider to the media drawer such that during motion of the intermediate slider the media drawer moves about twice as far as the intermediate slider whereby the combined length of the intermediate slider and the media drawer is sufficient to move the media drawer from the import/export element base to outside the data media storage library.

2. The improved import/export element of claim 1, wherein the drive means further comprises a drive motor attached to the import/export element base, a drive gear driven by the motor, and a gear rack attached to the intermediate slider and the gear rack engaging the drive gear.

3. The improved import/export element of claim 1, wherein the coupling means further comprises a drive belt, a first idler pulley attached to one end of the intermediate slider, a second idler pulley attached to the opposite end of the intermediate slider, the drive belt engaging the first idler pulley and second idler pulley and the drive belt having a loop on either side of the intermediate slider, one loop of the drive belt being fastened to the import/export element base, the second loop of the drive belt being fastened to the media drawer, whereby motion of the intermediate slider imparts twice as much motion to the media drawer through the drive belt.

4. The improved import/export element of claim 1, wherein the import/export element base further comprises a pair of first guide rails slidingly engaging and supporting the intermediate slider.

5. The improved import/export element of claim 1, wherein the import/export element base further comprises sensors for determining the position of the intermediate slider and the media drawer.

6. The improved import/export element of claim 4, wherein the import/export element base further comprises a stop to limit the motion of the intermediate slider.

7. The improved import/export element of claim 1, wherein the intermediate slider further comprises a pair of second guide rails slidingly engaging and supporting the media drawer.

8. The improved import/export element of claim 7, wherein the intermediate slider further comprises a stop to limit the motion of the media drawer.

9. The improved import/export element of claim 1, wherein the media is presented to the import/export element in a media tray, and wherein the media drawer further comprises a media tray receiving guide and a media tray latch engaging the media tray as the media drawer extends outside the data media storage library.

10. In a data media storage library for storing and accessing storage media of the type having a media transport element servicing an import/export element, a media storage element and a data transfer element, the data transfer element being longer than the media storage element and the import/export element and the import/export element, media storage element and data transfer element being in substantial alignment for servicing by the media transport element, an improved import/export element for inserting data media into the data media storage library and removing data media from the data media storage library, the improved import/export element comprising:

(a) an import/export element base in substantial alignment with the media storage element and data transfer element for servicing by the media transport element;

(b) an import/export element intermediate slider slidingly engaged with the import/export element base and moving in and out of the import/export element base;

(c) an import/export media drawer holding the media and slidingly engaged with the intermediate slider and moving in and out of the import/export element base and extending outside the data media storage library;

(d) drive means attached to the import/export element base for moving the intermediate slider into and out of the import/export element base; and (e) coupling means for transmitting the motion of the intermediate slider to the media drawer such that during motion of the intermediate slider the media drawer moves about twice as far as the intermediate slider wherein the coupling means further comprises a drive belt, a first idler pulley attached to one end of the intermediate slider, a second idler pulley attached to the opposite end of the intermediate slider, the drive belt engaging the first idler pulley and second idler pulley and the drive belt having a loop on either side of the intermediate slider, one loop of the drive belt being fastened to the import/export element base, the second loop of the drive belt being fastened to the media drawer, whereby motion of the intermediate slider imparts twice as much motion to the media drawer through the drive belt, whereby the combined length of the intermediate slider and the media drawer is sufficient to move the media drawer from the import/export element base to outside the data media storage library.

11. The improved import/export element of claim 10, wherein the drive means further comprises a drive motor attached to the import/export element base, a drive gear driven by the motor, and a gear rack attached to the intermediate slider and the gear rack engaging the drive gear.

12. The improved import/export element of claim 10, wherein the import/export element base further comprises a pair of first guide rails slidingly engaging and supporting the intermediate slider.

13. The improved import/export element of claim 10, wherein the import/export element base further comprises sensors for determining the position of the intermediate slider and the media drawer.

14. The improved import/export element of claim 12, wherein the import/export element base further comprises a stop to limit the motion of the intermediate slider.

15. The improved import/export element of claim 10, wherein the intermediate slider further comprises a pair of second guide rails slidingly engaging and supporting the media drawer.

16. The improved import/export element of claim 15, wherein the intermediate slider further comprises a stop to limit the motion of the media drawer.

17. The improved import/export element of claim 10, wherein the media is presented to the import/export element in a media tray, and wherein the media drawer further comprises a media tray receiving guide and a media tray latch engaging the media tray as the media drawer extends outside the data media storage library.

18. An improved import/export element for a data storage library system of the type having a magazine containing a number of trays holding media and a drive for reading and writing the media, the improved import/export element comprising:

(a) an import/export element base;

(b) an import/export element intermediate slider slidingly engaged with the import/export element base and moving in and out of the import/export element base;

(c) a tray drawer holding a tray containing the media and the tray drawer being slidingly engaged with the intermediate slider and moving in and out of the import/export element base and extending outside the library system;

(d) a drive motor attached to the import/export element base, a drive gear driven by the drive motor, and a gear rack attached to the intermediate slider and the gear rack engaging the drive gear; and (e) a drive belt, a first idler pulley attached to one end of the intermediate slider, a second idler pulley attached to the opposite end of the intermediate slider, the drive belt engaging the first idler pulley and second idler pulley and the drive belt having a loop on either side of the intermediate slider, one loop of the drive belt being fastened to the import/export element base, the second loop of the drive belt being fastened to the tray drawer, whereby motion of the intermediate slider imparts twice as much motion to the tray drawer through the drive belt, whereby the combined length of the intermediate slider and the tray drawer is sufficient to move the tray drawer from the import/export element base to outside the library system.

19. The improved import/export element of claim 18, wherein the import/export element base further comprises a pair of first guide rails slidingly engaging and supporting the intermediate slider.

20. The improved import/export element of claim 18, wherein the import/export element base further comprises sensors for determining the position of the intermediate slider and the tray drawer.

21. The improved import/export element of claim 19, wherein the import/export element base further comprises a stop to limit the motion of the intermediate slider.

22. The improved import/export element of claim 18, wherein the intermediate slider further comprises a pair of second guide rails slidingly engaging and supporting the tray drawer.

23. The improved import/export element of claim 22, wherein the intermediate slider further comprises a stop to limit the motion of the tray drawer.

24. The improved import/export element of claim 18, wherein the tray drawer further comprises a tray receiving guide and a tray latch engaging the tray as the tray drawer extends outside the data media storage library.

* * * * *